United States Patent [19]

Lien

[11] Patent Number: 4,802,982

[45] Date of Patent: Feb. 7, 1989

[54] SPIRAL-WOUND MEMBRANE WITH IMPROVED PERMEATE CARRIER

[75] Inventor: Larry A. Lien, Solana Beach, Calif.

[73] Assignee: Desalination Systems, Inc., Escondido, Calif.

[21] Appl. No.: 103,633

[22] Filed: Oct. 1, 1987

[51] Int. Cl.⁴ .............................................. B01D 13/00
[52] U.S. Cl. ................................. 210/247; 210/321.83
[58] Field of Search ........................... 210/247, 321.83

[56] References Cited

U.S. PATENT DOCUMENTS 4,028,250  6/1977  Loft ........................... 210/321.83 X

FOREIGN PATENT DOCUMENTS 0034702  2/1985  Japan ............................. 210/321.83

Primary Examiner—Frank Spear
Attorney, Agent, or Firm—Fitch, Even, Tabin & Flannery

[57] ABSTRACT

Disclosed are spiral-wound membrane cartridge constructions for use in ultrafiltration and reverse-osmosis separation equipment. The membrane constructions include a membrane layer directly bonded to a permeate carrier layer characterized by a channel material having a plurality of parallel ribs extending in a transverse permeate-carrying direction, interconnected by a relatively thin matrix of smaller fibrils. It advantageously reduces resistance to permeate flow to a central collection point, and can be employed to separate both liquid and gaseous fluids.

9 Claims, 3 Drawing Sheets

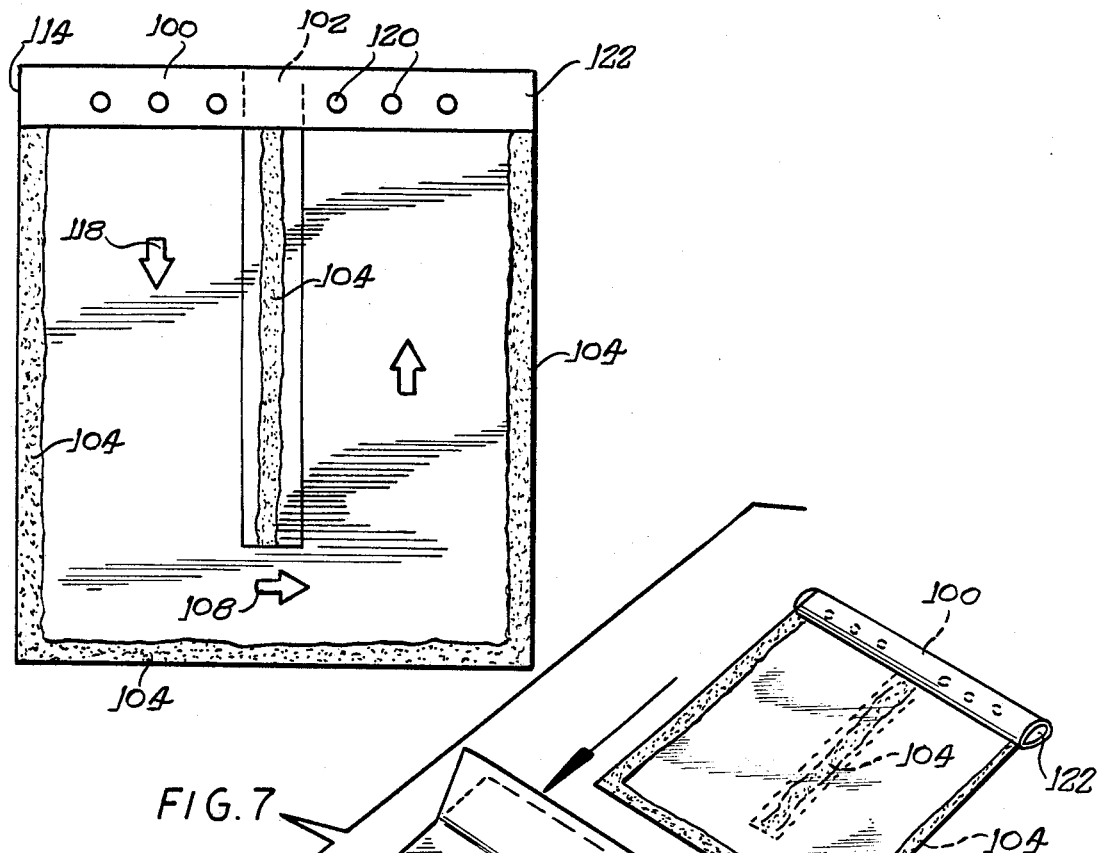
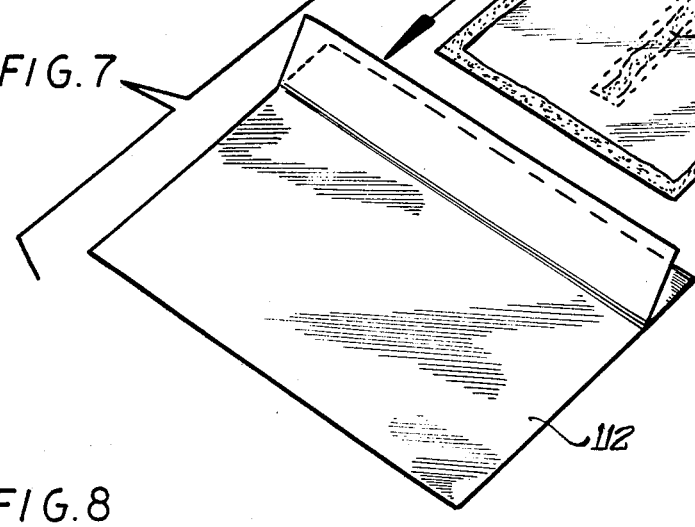
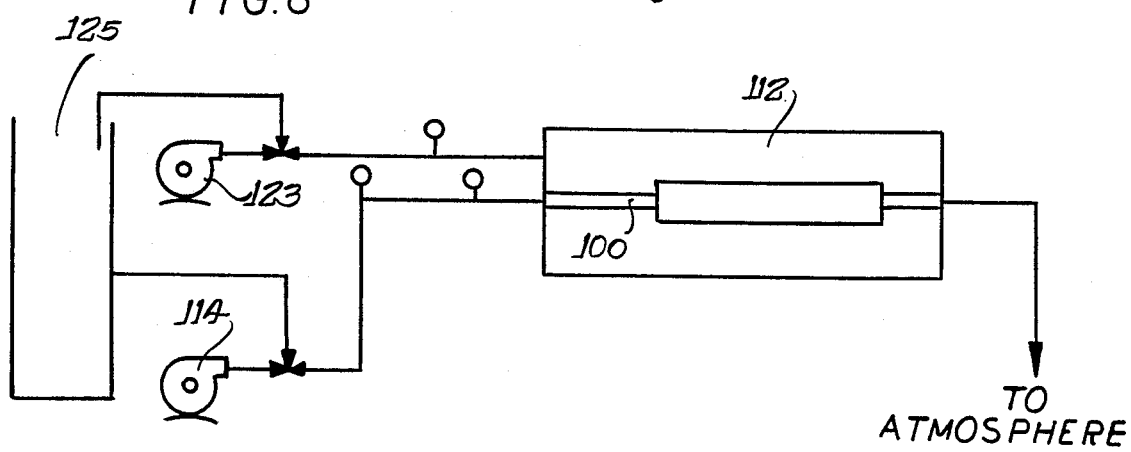

SPIRAL-WOUND MEMBRANE WITH IMPROVED PERMEATE CARRIER

BACKGROUND OF THE INVENTION

1. Field of the Invention

The present invention pertains to filtration modules and the like containing semipermeable membranes for separating one component from a fluid mixture of the one component and a second component, such as separating one liquid from another liquid or suspended solids, or a gas from a mixture of gases.

2. Description of the Prior Art

Reverse-osmosis and ultrafiltration membranes for the separation of a liquid from a second component, such as another liquid or suspended solids, have been known for some time. A variety of semipermeable membranes have been developed for both reverse-osmosis and ultrafiltration processes, whereas others have been successful in separating specific gases from gaseous mixtures. While such membranes have proven generally satisfactory in achieving separation, they must be incorporated into a filter module of some sort to provide a practical realization of the membrane performance. Several shortcomings of conventional filtration modules have been noted, some of which result from a particular combination of the semipermeable membrane and other materials layers that are adjacent to, and sometimes in contact with, the membrane.

Permeate carriers withdraw the desired permeate from the low-pressure side of the semipermeable membrane. In general, two areas where improvements have been sought in such filtration systems are in the throughput, or rate of collection, of the permeate and in the maintenance interval or service life of the filtration equipment, which areas may be closely related to each other in certain aspects. For example, the throughput or collection rate of the permeate is directly related to the pressure applied across the semipermeable membrane. In general, the higher the applied pressure, the faster the permeate is collected on the low pressure side of the membrane. However, applied pressures cannot be arbitrarily increased, because semipermeable membranes in general use today do not have a physical structure capable of withstanding very high pressures. That is, upon the application of excessive pressure to certain semipermeable membranes, a rupture of the membrane is experienced, with resulting destruction of the filtration module, as well as contamination of the permeate collected. Elevated pressures are employed not only to force the permeate through the material, but also to drive the permeate along its return path to a collection point, despite what is often referred to as side pressure loss, i.e., the resistance to flow of the permeate along or through a permeate carrier.

Even if a rupture of the membrane material is not experienced upon application of elevated pressures, membrane performance can be severely degraded due to sagging, folding or bunching of the material in the filtration device, which can arise principally from a stretching of the membrane material as higher working pressure is applied. Obviously, if the stretching is allowed to continue uncontrolled in a membrane that is not spatially confined, the membrane material will be weakened to the point of rupture. However, short of rupture, the membrane material can sag or bunch, increasing the resistance to permeate flow therethrough. In general, it is desirable to maintain the semipermeable membrane in a taut condition, so as to minimize the thickness of the semi-permeable membrane material through which a permeate is forced to travel.

In addition to providing physical support for the semipermeable membrane so as to prevent its stretching, sagging or rupture, additional layers of material are associated with a membrane in a typical filtration module to provide a return path for the permeate to a collection point. For example, some filtration systems in widespread use today have three layers, including a semipermeable membrane layer, supported upon a mechanical reinforcing or anti-bagging layer and a third layer providing a return path for the permeate. A popular permeate carrier in use today is comprised of Tricot material, which generally may be described as an epoxy or Melamine-coated polyester that has been woven.

Although Tricot material has frequently been a popular choice as a permeate carrier, other carrier materials have continued to be investigated in a search to find even better materials, e.g., having even lower resistance to liquid flow. For example, non-woven polypropylene carriers have been investigated, but have not proven entirely satisfactory, as they have been observed to lack the adhesion to the semipermeable membrane necessary to prevent bunching or sagging of the membrane material. Bunching of stretched semipermeable membranes causes the rapid appearance of locations where accelerated fouling occurs. For these reasons, commercial filtration manufacturers have relied on Tricot, either felt or woven material, to provide the backing and support of the membrane. A particularly advantageous combination of materials forming an integrated filtration system includes a polysulfone membrane, typically 4 mils in thickness, cast on a felt backing material also 4 mils in thickness, and a Tricot material such as K-1015 Hornwood Tricot having a 48 wale rating, i.e., 48 threads per inch. In addition to the polysulfone semipermeable membranes, another type of membrane has been suggested as having useful characteristics for separating oil-water mixtures. The other membrane material is manufactured by W. L. Gore & Associates, Inc., and is commonly referred to as "Gore-Tex." U.S. Pat. No. 3,953,566 discloses a process for producing the material, and suggests several possible filtration applications. Among the filtration applications listed in the patent is the separation of kerosene from a kerosene-water mixture, as an example of a separation of fluids that wet tetrafluoroethylene polymers from non-wetting fluids. More advantageous commercial embodiments using this membrane are sought, particularly ones which will prove themselves in a commercial environment.

SUMMARY OF THE INVENTION

Accordingly, it is an object of the present invention to provide a filtration module constructed from a minimum number of layers of different materials, and exhibiting improved side pressure loss, and more particularly having side pressure losses lower than those commonly experienced with systems using a Tricot carrier material.

Another object of the present invention is to provide a filtration module of the above-described type which is spirally wound into a compact, generally cylindrical package.

These and other objects of the present invention which will become apparent from studying the appended description and accompanying drawings are provided in a membrane cartridge for separating a first component from a fluid mixture of the first component and a second component. As used herein, the term "fluid" refers to gases as well as liquids. The cartridge consists of a porous, sheet-like membrane having pores sized to allow passage of the first fluid component in a generally transverse direction, while rejecting passage of the second fluid component therethrough. A permeate carrier layer of structured, non-random, non-woven channel material having a plurality of generally parallel ribs on its surface, forms permeate-carrying channels extending in a preselected direction of exit flow. The carrier further includes conduit means for conducting the exit flow of the first component permeate away from the channels.

In one embodiment, the permeate carrier layer is characterized by an ordered structure consisting of plurality of spaced, generally parallel ribs of preselected size forming the channels between adjacent pairs thereof, the ribs being interconnected by a web-like matrix of much smaller fibrils.

In one embodiment, a leaf formed of the membrane and permeate carrier layer is joined to and wound spirally about the conduit means, together with a sheet of porous supply material. The leaf comprises a composite layer of the membrane adhering to the permeate carrier layer and folded at an outer edge remote from the conduit means, so as to create a sandwich of two layers of the permeate carrier in contact with each other between two outer sheets of membrane.

In another embodiment, the cartridge preferably includes a pair of spaced strips of adhesive joinder material extending from the conduit means to the folded free end of the composite layer, so as to create an envelope which prevents flow of the fluid mixture into the channels and other than through the membrane.

BRIEF DESCRIPTION OF THE DRAWINGS

In the drawings, wherein like elements are referenced alike,

FIG. 6 is a schematic diagram of an arrangement for performing tests on various membrane cartridge designs;

FIG. 7 is an exploded view of the test arrangement of FIG. 6, shown in diagrammatic form; and FIG. 8 is a schematic diagram showing the test arrangement of FIGS. 6 and 7 connected in a system for carrying out performance tests of those arrangements.

DETAILED DESCRIPTION OF THE PREFERRED EMBODIMENT

Figure 1:
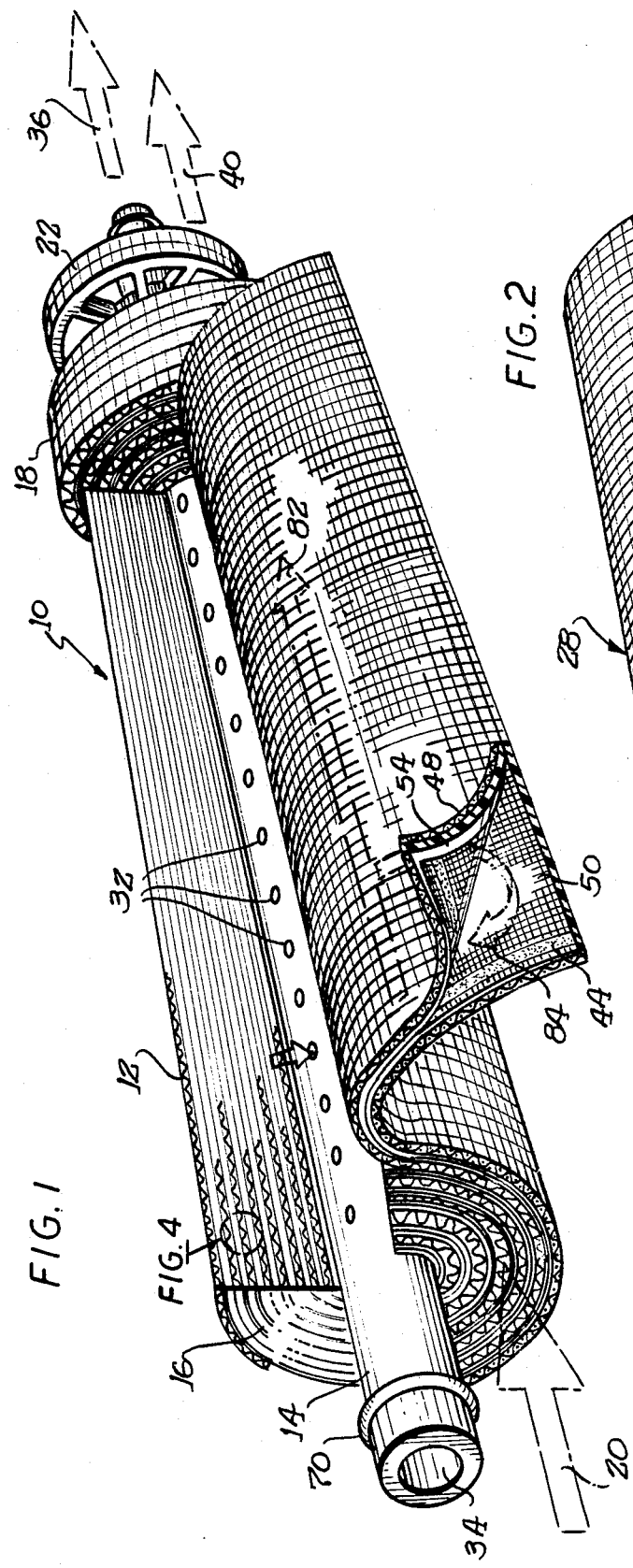
FIG. 1 is a perspective view of a membrane cartridge embodying various features of the invention.
Figure 2:
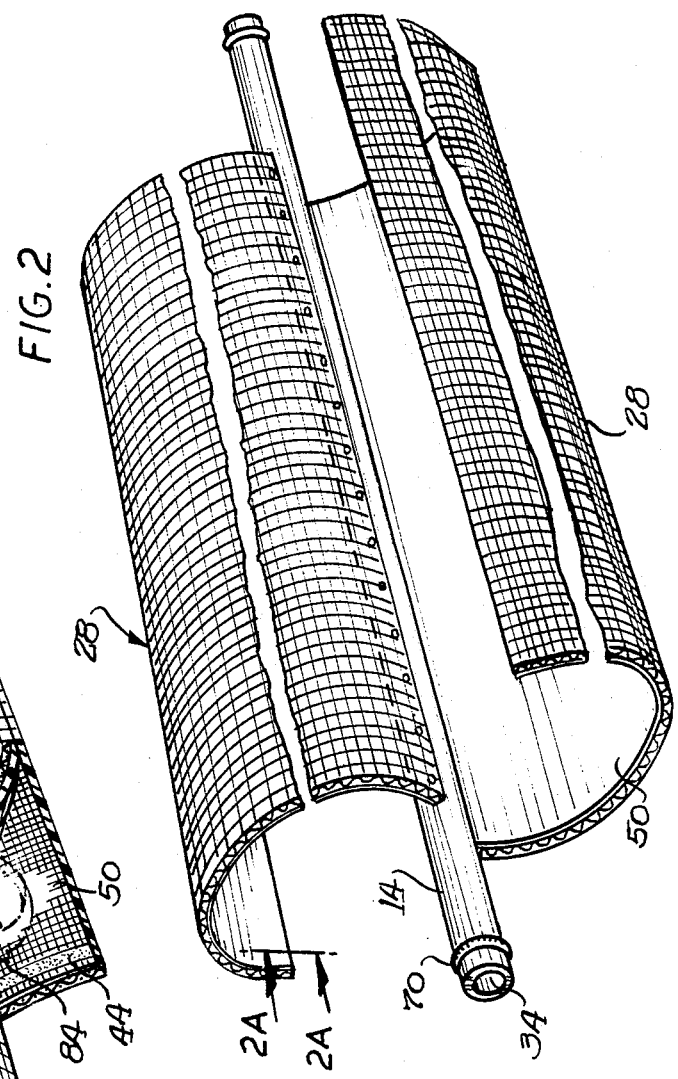
FIG. 2 is a perspective view of the membrane cartridge of FIG. 1 shown partially unwrapped.
Figure 2A:
FIG. 2a is an enlarged fragmentary view of the membrane cartridge of FIG. 2.
Figure 3:
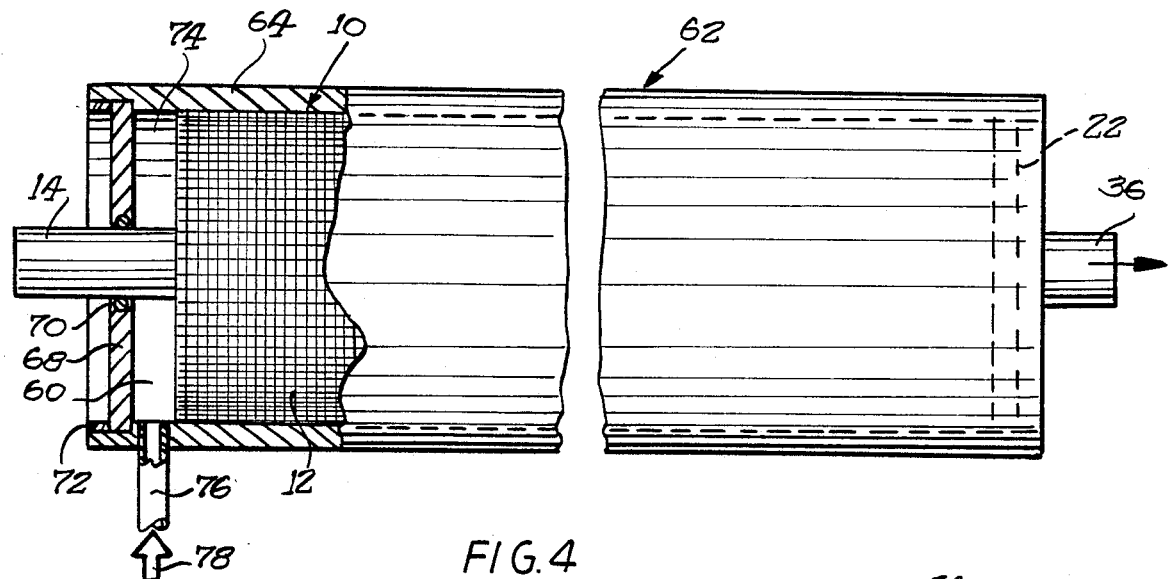
FIG. 3 is a side elevational view, partly broken away, of the combination of the membrane cartridge of the above Figures, and a pressure-resistant container.

Referring first to FIGS. 1-3, a membrane cartridge 10 embodying various features of the invention comprises a multilayer, wrapped cylindrical body 12 at the axis of which is a product or permeate collection tube 14 that protrudes from the upstream and downstream ends 16, 18 of body 12. As will be explained in greater detail herein, a feed solution is applied to the upstream end of the membrane cartridge, as indicated by the direction of arrow 20. In order to prevent the downstream displacement of the outer layers of body 12, an anti-telescoping member, such as a wheel-like structure 22, is attached to tube 14 at the downstream thereof, so as to be placed in abutting contact with the downstream end 18 of the cylindrical body 12.

Referring now to FIG. 2, body 12 is assembled by wrapping one or more composite leaves generally indicated at 28. As will be seen, the leaves include one or more porous membranes for performing the desired separation, including separations of the reverse-osmosis and ultrafiltration types. As illustrated, body 12 consists of two leaves 28 which are attached at a radially inner end to the tube 14. The radially inner edges 30 of leaves 28 are aligned to overlie a generally linear array of apertures 32 which allow the collected permeate to enter the interior 34 of tube 14, exiting in a downstream direction as indicated by arrow 36 of FIG. 1. The feed solution component rejected by the membrane exits the downstream end of the cartridge, generally through the anti-telescoping member 22, as a concentrate flow 40. Frequently, the exiting flow is a concentrated solution of the rejected component, which may be either suspended solids or another, undesired liquid.

As indicated schematically in the cut-away portion of FIG. 1, the upstream and radially outer edges of the leaves are sealed, preferably by adhesive 44, to prevent intrusion of the feed solution into the leaf interior which would, in effect, bypass the separation membrane incorporated in the leaf. Although not visible in the cut-away portion of FIG. 1, the downstream edge of the leaves is likewise sealed to prevent any backflow intrusion of the feed solution into the permeate-collecting tube 14.

Referring now to the construction of each leaf in greater detail, the leaves generally comprise a porous grid sheet 48, preferably formed from an open channel material such as Vexar or other porous supply material. The grid sheet 48, which carries or supplies feed solution into the interior of body 12, overlies a composite membrane structure 50 which, when fully assembled, is generally sheet-like in form, coextensive with the grid sheet 48. As the grid sheet 48 and composite membrane structure 50 are wound about collection tube 14, the grid sheet forms a spacer between flanking composite membrane structures, and preferably functions to distribute feed solution across the (wrapped) surfaces of the composite membrane structure 50, thereby assuring maximum utilization of the membrane structure.

Figure 4:
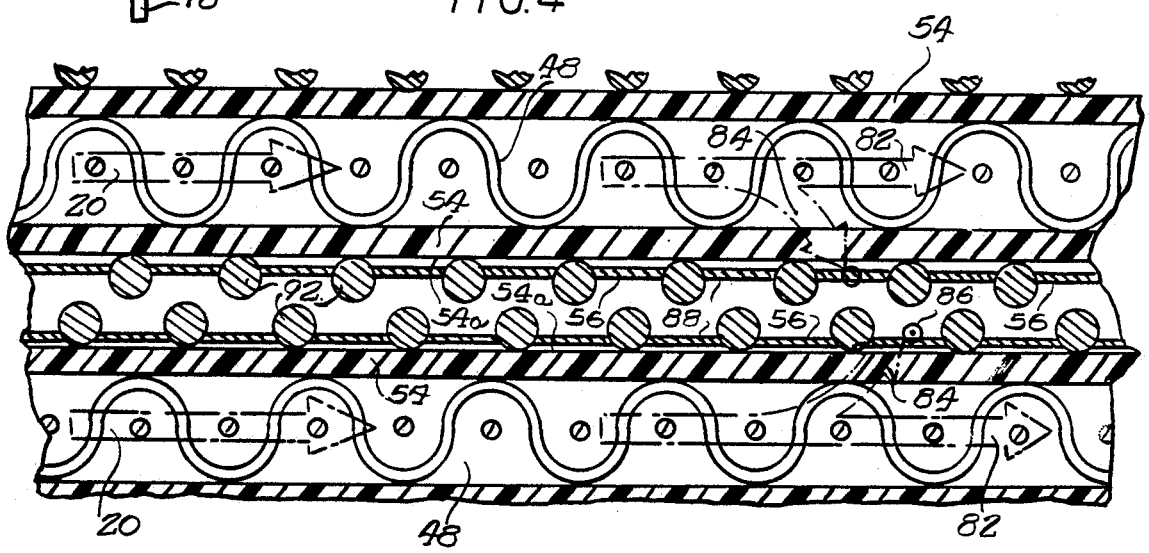
FIG. 4 is a fragmentary cross-sectional view of the membrane illustrated in the above Figures.

Referring additionally to FIG. 4, a fragmentary view of several spiral-wound layers comprising the membrane cartridge 10, a single layer of composite membrane structure 50 is illustrated, at a point remote from the edges sealed by adhesive 44. The composite membrane structure 50 is surrounded by two layers of a common porous grid sheet 48. The composite membrane structure consists of a mirror image arrangement of membrane layers 54 and carrier layers 56. According to one aspect of the present invention, the composite membrane structure 50 is fabricated by laminating a membrane layer 54, to a generally coextensive permeate carrier layer 56, each layer twice as long as the desired length of the cartridge leaf. The membrane and carrier layers are then folded in half so that the folded portions of carrier layer 56 directly oppose each other, as illustrated in FIG. 4, and when wound in a spiral cartridge, contact each other. Thereafter, a single grid sheet 48 is arranged to overlie the composite membrane structure before the grid sheet and composite membrane structure are wrapped about tube 14 to form the cylindrical membrane body 12 illustrated in FIG. 1.

Referring now to FIG. 3, the cylindrical body 12 is then telescopically inserted in an open end 60 of a generally cylindrical pressure-resistant container 62. Container 62 includes a generally cylindrical sidewall 64 and has a downstream end with a lip 66 for engaging the wheel-like anti-telescoping member 22. The upstream end of container 62 is enclosed by a generally circular disk 68 which has a central opening to allow the protrusion of the upstream end of collection tube 14, therethrough. An "O" ring 70 seals the collection tube 14 to the disk 68. The disk 68 is preferably held in position about the upstream end of container 62 by a resilient snap ring 72. In order to facilitate the introduction of a pressurized feed solution at the upstream end of the cylindrical membrane body 12, a plenum is formed between the body 12 and the disk 68. The spacing between body 12 and disk 68 is maintained by the frictional engagement of "O" ring 70 with collection tube 14 and disk 68. If desired, a ring-like, or wheel-like spacer structure can be inserted in the plenum to further guarantee the cavity size required, although such is generally not preferred, since some obstruction of outer the grid layers 48 results. An inlet connection 76 provides introduction of a feed solution into the plenum 74, for subsequent separation by the membrane cartridge. The flow of incoming feed solution is generally indicated by the arrow 78, with the feed solution thereafter entering the upstream edges of the grid sheet layers 48, traveling through cartridge 10 toward the downstream end thereof, as generally designated by the arrow 82 of FIG. 1.

Figure 5:
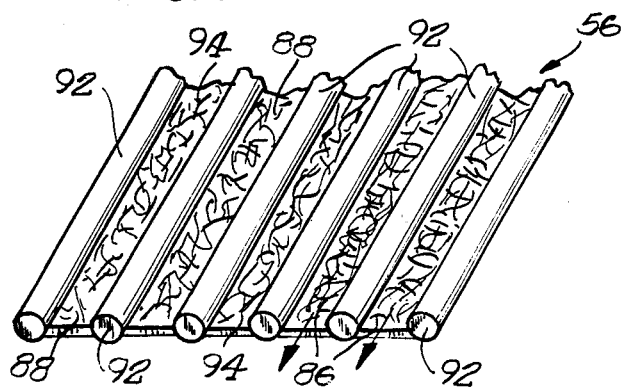
FIG. 5 is a fragmentary perspective view of a portion of a backing material illustrated in FIG. 4.

With additional reference to FIG. 4, as the feed solution travels in a downstream direction, it disperses along the longitudinal lengths of the grid sheet layers, "branching" in radially inward and outward directions, as indicated by the arrows 84 of FIGS. 1 and 4, so as to pass through adjacent membrane layers 54. Referring to FIGS. 4 and 5, passage through the membrane layer 54 causes separation of the permeate from the concentrated feed solution, with the permeate exiting the membrane 54 at its low pressure side 54a, entering channels 88 of carrier 56. In FIG. 4, flow of the permeate continues in a direction out of the plane of the drawing, being illustrated as an arrowhead 86 graphically depicted by a circled point. The permeate continues along the channels 88, generally exiting at the radially inner end of carrier 56 so as to enter the apertures 32 of collection tube 14, exiting therefrom as indicated by the arrow 36 of FIG. 1.

According to an important feature of the present invention, membrane 54 is placed in direct contact with carrier 56. Previously, membranes were either cast directly onto a separate intermediate backing layer, or were otherwise secured to an intermediate backing layer which aided in storage and transport of the membrane. For example, a commercially successful ultrafiltration element has a polysulfone membrane directly cast onto a polypropylene felt backing layer which supports the membrane material against puncture and excessive deformation upon the application of elevated feed pressures. The permeate exiting the low pressure side of the polysulfone membrane must pass through the felt backing member before reaching a separate third carrier layer which directs the permeate to a collection site. In the conventional ultra-filtration assembly referred to herein, the carrier layer is comprised of a coated woven material, such as Tricot, an epoxy or Melamine-coated polyester woven material to form permeate-carrying layers.

The direct attachment of the membrane material to a permeate carrier, without an intervening backing layer, not only produces a construction which is more space-efficient, allowing additional layers of membrane material for a given cartridge size, but also improves separation efficiency (as will be seen in examples, below) while enhancing the resistance to membrane stretching. The permeate carrier material, according to one aspect of the present invention, preferably comprises a commercially available cost-efficient unitary sheet of non-woven polypropylene channel material, having a thickness ranging between 1 mil and 150 mils, and preferably about 12 mils, having an ordered structure, consisting of smooth, relatively thick ribs extending in the permeate-carrying direction 86, interconnected by much thinner generally transverse fibrils or strands of the same polypropylene material. A schematic representation of the channel material, as seen under microscopic magnification, is illustrated in FIG. 5, wherein a plurality of generally parallel thick ribs 92 extend in the permeate-flow direction 86, i.e., transverse to the longitudinal axis of the spirally-wound cartridge. The ribs 92 are interconnected by a mesh-like or web-like matrix of generally transverse fibrils or strands 94 having a much smaller cross section than that of the ribs 92, preferably ranging between 0.05 and 0.25 of the rib diameter. The interconnecting strands 94 are preferably located close to one edge of the rib cross section, and form a matrix having a thickness less than the radius of the ribs 92, so as to lie entirely to one side of the central axis thereof. Preferably, the matrix has a thickness ranging between one-fourth and one-half of the rib diameter. Further, it is preferred that the upstream or high pressure side of the matrix (that located adjacent the membrane) be recessed slightly from the membrane-contacting surface of the ribs, by an amount ranging between 5% and 25% of the rib diameter. Two examples of the materials useful for the backing layer are commercially available Conwed and Nalle materials available from the Conwed Plastics Corporation and Nalle Plastics Corporation, respectively.

According to other aspects of the present invention, the ribs 92 of the channel material material are provided in a density ranging between about 10 and about 100, and preferably between about 20 and about 60, channels or ribs per inch (wale). Although the "bottom end" of each channel 88 formed between adjacent ribs is not totally enclosed, the rib spacing and depth of the channels is such as to provide a preferred low resistance path for permeate moving spirally inward toward a collection site, such as the collector tube 14 described above.

The Conwed and Nalle materials referred to above are available in different configurations, having different wale (rib count per inch), pore size, pore density, major rib size, fibril size, and fibril mat thickness. Three examples of combinations of different channel material configurations and membrane layers will be given below. In general, it is preferred that the Conwed material have between 10 and 40 channels per inch, preferably 20 channels, a thickness ranging between 1 mil and 150 mils, pore size ranging between 0.5 mil and 100 mils, and pore density ranging between 1 and 500. It is preferred that the Nalle material have between 10 and 75 channels per inch, preferably 55, a thickness ranging between 1 mil and 150 mils, pore size ranging between 0.5 mil and 100 mils, and pore density ranging between 1 and 500.

The preferred porous membrane material of the present invention is that described in U.S. Pat. No. 3,953,566, comprising an expanded, amorphous-locked film of tertrafluoroethylene polymer having a microstructure characterized by nodes interconnected by fibrils, commercially available under the trademark Gore-Tex, available from W. L. Gore and Associates, Inc. of Newark, Del.

By way of background information, during the initial stages of developing several aspects of the invention described herein, the amorphous-locked membrane material was ordered and received from the manufacturer with a polypropylene or polyester felt backing which helped prevent damage of the thin (2 micron thick) membrane material during shipping. A coated woven polyester (e.g., Tricot material) carrier for the permeate was applied as a third layer. As development continued, it was found that improved cartridge efficiency of the amorphous-locked membrane could be achieved by replacing the coated, woven polyester carrier with non-woven polypropylene channel materials, of the type described above with reference to FIG. 5. According to further aspects of the present invention, greatly improved performance, including up to a tenfold improvement in "side pressure loss", was achieved by eliminating the intermediate non-woven felt backing layer, and laminating the amorphous-locked membrane directly to a non-woven polypropylene channel material, preferably using heat and pressure in the lamination process. The term "side pressure loss" will be developed below, in conjunction with a discussion of test results quantifying the improved performance of cartridges constructed according to one aspect of the present invention, where membrane and permeate carrier materials are joined together without a third, intermediate backing layer.

EFFECT OF LEAF LENGTH AND NUMBER OF LAYERS ON CARTRIDGE EFFICIENCY

Of the various factors affecting spiral-wound separation elements, one critical factor affecting performance is the pressure required to force the permeate out of the membrane leaf into a central collection tube. In general, the greater the length of the leaf or membrane construction, the greater is the fraction of total available pressure needed to perform the separation process and to deliver the permeate at a desired location. A brief study was made to quantify what effect different lengths and number of layers have on cartridge efficiency. Three elements, or porous membrane configurations were studied. Each of the three elements is four inches wide and has the same total amount of active surface area, 300 square feet. The first configuration has one leaf, the second has eight leaves, and the third has 20 leaves, all with equal total membrane size.

It will be assumed that with the leaf fully extended and laid flat, the membranes are each sealed with a generally U-shaped seal, the free ends of which are joined to the central collection tube. The same side-seal area (one inch wide) is assumed for each element. The lost area of each element due to side seals will therefore be 1 inch×2×195 inches or 2.7 square feet. The only variable between the different elements is the number of end-sealed leaves.

The cartridge performance factor, $\beta$, of the three elements is listed in the following table. In general, $\beta$ was independently determined, using a graph of:

$$\beta \text{ vs } \alpha$$

where $\beta$=cartridge efficiency factor in % from 0% to 100% and $$\alpha = L\sqrt{2AH}$$

where
L=leaf length, cm
A=A-value, flux, and
H=product side pressure loss coefficient.

TABLE 1
$\beta$ AND PROCESS WATER INFLUX (GPD) FOR LEAVES OF DIFFERENT LENGTHS

| Element | No. of Leaves | Leaf Length | $\beta$ | Active Area (in sq. ft.) | GFD | GPD |
|---|---|---|---|---|---|---|
| 1 | 1 | 195" | .3 | 96.3 | 30 | 867 |
| 2 | 8 | 24.38" | .95 | 89.1 | 30 | 2539 |
| 3 | 20 | 9.75" | .99 | 69.5 | 30 | 2064 |

As can be seen, the cartridge efficiency factor $\beta$ is a function of leaf length. Using the following formula, certain trends regarding process water influx and cartridge efficiency can be observed:

$$GPD = \beta \times GFD \times A$$

where
GPD is the influx of process water in gallons per day,
GFD is the influx expressed in gallons per square foot of membrane area per day. (For each of the three elements, the gallon-per-square-foot-per-day influx is the same, GFD=30.)
$\beta$ is the performance or cartridge efficiency factor, and
A is the active area of the membrane in the cartridge.

The first element studied has one leaf, 195 inches long, with an active area of 96.3 square feet which can accommodate an input of 867 gallons per day with a cartridge efficiency factor, $\beta$, of 0.3. The second element is constructed from the same amount of membrane material (300 square feet) and divides the membrane material into eight leaves, each 24.38 inches long. The second element can accommodate 2539 gallons per day and has a cartridge efficiency of 0.95. The third element divides the membrane material into 20 leaves, each having a length of 9.75 inches, and can accommodate 2064 gallons per day with a cartridge efficiency, $\beta$, of 0.99.

Whereas the active membrane area for the first element having one leaf is 96.3, the increased loss due to adhesion of the ends of the leaves gives rise to greater reductions of active membrane area. For example, the second element having eight leaves has only 89.1 square feet of active area, whereas the third element has 69.5 square feet of active membrane area.

As can be seen from the foregoing Table, the cartridge efficiency factor $\beta$ is a function of leaf length, and number of layers, which in turn are determined by the material chosen for the permeate carrier. While cartridge efficiency increases with the number of leaves, the construction costs for such arrangements increases dramatically, dictating a compromise in leaf count. The present invention, as will be seen, provides greatly improved efficiency so that a cartridge of comparable performance can now have fewer leaves while providing substantially lower resistance to permeate flow. In light of the above, the choice of materials is seen to have a significant impact on the performance of a spiral-wound cartridge.

SIDE PRESSURE LOSS

The "side pressure loss" of a cartridge, or resistance to permeate return flow referred to above as a key limiting factor in the performance of a spiral-wound cartridge, is expressed as the pressure required to force the permeate out of the membrane leaf into a central collecting tube. The following series of equations aid in defining the product water side pressure drop constant, H, having units of seconds-atmospheres per gram, which directly expresses product side pressure loss. For cartridges in which the pressure loss on the permeate side is small compared to the net driving pressure (NDP), the pressure from the end of leaf to the central tube is $$\Delta P_L = HV\rho L^2$$
where
$$V_P = A(\Delta P_s - \Delta \pi)$$
or
$$\frac{\Delta P_L}{\Delta P_s - \Delta \pi} = HAL^2$$

and where the average over the entire membrane surface is $$\overline{\Delta P_L} = \tfrac{2}{3} HV\rho L^2$$

and $\beta$ may now be defined as:

$$1 - \frac{\overline{\Delta P_L}}{\Delta P_s - \Delta \pi}, \text{ or } 1\tfrac{2}{3} HAL^2$$

For a more rigorous case in which the net driving pressure varies with the variation of the product side pressure, $$\beta = \frac{1}{\alpha} \cdot \frac{e^\alpha - e^{-\alpha}}{e^\alpha + e^{-\alpha}}$$
where $\alpha = L\sqrt{2AH}$ In the above equations:
$P_L$=pressure drop from end of leaf to central tube, atms.
$H$=product water side pressure drop constant, sec-atm/gm.
$V$=velocity through the membrane surface, cm/sec.
$\phi$=density of water, gms/cm$^3$.
$A$=membrane constant, gms/cm$^2$-sec-atm.
$\Delta P_s$=system pressure over pressure in cartridge central tube, atm.
$\Delta \pi$=osmotic pressure difference across membrane, atm.
$\beta$=cartridge efficiency factor, dimensionless
$\alpha = L\sqrt{2AH}$, dimensionless
$L$=active leaf length, cm

EXAMPLES OF SIDE PRESSURE LOSS FOR FOUR MEMBRANE CONSTRUCTIONS

In the following four examples, H-values are empirically determined for different membrane and carrier configurations. The first three examples show two-layer constructions embodying principles of the present invention, whereas the fourth example is for a conventional three-layer construction included herein for comparison purposes. Referring now to FIGS. 6-8, the test setup for determining the H-values (side pressure loss or resistance to permeate return flow) of the four examples includes a control tube 100 which is perforated along its length and blocked at its center 102. Two layers of the membrane and carrier materials to be tested are joined together with adhesive lines 104 in the manner indicated in FIG. 6. A line 104 extends from the central plug 102 of the collection tube 100, terminating in a free end spaced from the edge of the membrane-carrier construction, so as to form a gap 108 therewith. The membrane and carrier layers are joined on three sides, and the fourth side is bonded to the tube 100.

A pump 123 pressurizes bag 112 with water from supply 125 so as to support the test membrane constructions as permeate is pumped along their permeate carrier layers. Bag 112, in effect, provides a pressure housing in which the membrane being tested is operated. The membrane, carrier layers and the tube are inserted in a thin plastic bag 112 as indicated in FIG. 7, and the bag is folded over and sealed about the tube 100. If desired, the bag could be replaced by a rigid cylinder, for example. A pressurized water feed solution is directed by pump 140 (see FIG. 8) into the upstream end or inlet 114 of tube 100, and flows through the upstream series of perforations 116 in a radially outward direction along the permeate carrier as indicated by arrow 118. The flow continues around the free end of the central joinder line 104 and thereafter reverses direction, returning along the downstream permeate carrier portion to the series of perforations 120 located at the downstream end of the tube, being discharged at an outlet 122 to the atmosphere. The feed solution is thereby directed through the interior of the membrane-carrier construction, so as to emulate a flow of permeate exiting the low pressure side of a porous membrane where permeate is formed. In this manner, the resistance to permeate flow, as experienced by permeate flowing between samples of different permeate carrier and membrane materials, can be observed. These specialized tests are not concerned with the pressure required to drive the permeate through the membrane material, but rather are concerned only with the return of the permeate, once formed, to a central collection point.

The first three examples, each use the same membrane, a layer of K-200 Gore-Tex material, having a pore size of about 0.2 microns and a thickness of about 2.5 mils (0.0025 inch), with the Gore-Tex membrane material laminated onto three different carrier materials. In the first two examples the carrier is made from Conwed polypropylene channel material, the first example having a 25 channel count per inch and the second example having a 20 channel count per inch. In the third example, the Gore-Tex membrane is laminated onto a Nalle polypropylene channel material having 56 channels per inch. For purposes of comparison, the fourth example is directed to a conventional construction, wherein a polysulfone E-500 membrane is cast on a non-woven polyester felt backing layer designated K-1015, available from Kendall Fabrics, Inc. and used with a third permeate carrier layer consisting of Hornwood Tricot having a 48 wale rating. The following Table summarizes the materials used and the H-values measured for each arrangement. The H-values were determined according to the following formula:

$$H = 4.08 \frac{W(\Delta p, \text{ psi})}{L(\text{ml/min, net 75}° \text{F.})}$$

TABLE 2

| EXAMPLE | MEMBRANE | BACKING | TRICOT | H-VALUE |
|---|---|---|---|---|
| 1 | Gore-Tex .2 | Conwed, 25 wales | None | .0525 |
| 2 | Gore-Tex .2 | Conwed, 20 wales | None | .0295 |
| 3 | Gore-Tex .2 | Nalle, 56 wales | None | .0450 |
| 4 | Polysulfone E-500 | Polyester felt | Hornwood K-1015 | .351 |

As can be seen, a greater than ten-fold improvement in H-value over the conventional three layer construction is achieved with a 20 wale Conwed carrier.

EXAMPLE 1

The following Table lists the H-value calculations for a K-200 Gore-Tex membrane 0.2 microns in pore size laminated onto a Conwed channel material having a 25 wale rating. The system pressure was maintained at 20 psi at a temperature of 70° F., and no end leakage was observed.

TABLE 3

H-VALUE DETERMINATION (EXAMPLE 1)

| Hrs. at Press | F-B Side Press, psi | P psi | Temp °F. | TCF | Flow (GFD) | ml/min Gross | ml/min Net, 75° F. | H, 75° F. sec-atm/gm |
|---|---|---|---|---|---|---|---|---|
| 1 | 20 | 5 | 70 | 1.05 | 33 | 33 | 34.6 | .0525 |
| 2 | 20 | 5 | 70 | 1.05 | 33 | 33 | 34.6 | .0525 |
| 3 | 20 | 5 | 70 | 1.05 | 33 | 33 | 34.6 | .0525 |
| 4 | 20 | 5 | 70 | 1.05 | 33 | 33 | 34.6 | .0525 |

Where:
F-B Side Press is feed and brine side pressure,
ΔP psi pressure differential (pressure loss through permeate spacer material),
TCF is temperature correction factor based on the viscosity of water normalized to 75° F.
Having determined the H-value of 0.0525, its correlation to cartridge efficiency, $\beta$, is given as follows:

TABLE 4

H-VALUE CORRELATION TO CARTRIDGE EFFICIENCY, $\beta$ (EXAMPLE 1)

| A-value (g/s-cm²-atm) | Length (cm) | $\sqrt{2AH}$ | $\alpha = L\sqrt{2AH}$ | $\beta$ |
|---|---|---|---|---|
| 100 | 25" = 63.5 | .01025 | .651 | .876 |
| 500 | 63.5 | .02291 | 1.454 | .610 |
| 1,000 | 63.5 | .03240 | 2.057 | .424 |
| 5,000 | 63.5 | .0726 | 4.610 | .212 |
| 10,000 | 63.5 | .10246 | 6.530 | .154 |
| 20,000 | 63.5 | .1449 | 9.212 | .107 |
| 30,000 | 63.5 | .1816 | 11.586 | .088 |

EXAMPLE 2

The following Table lists the H-value determinations for the arrangement of Example 2, wherein a K-200 Gore-Tex membrane 0.2 microns in pore size is laminated onto a Conwed backing having a 20 wale rating. System pressure was maintained at 35 psi and a temperature of 86° F. No end leakage was observed.

TABLE 5

H-VALUE DETERMINATION (EXAMPLE 2)

| Hrs. at Press | F-B Side Press, psi | P psi | Temp °F. | TCF | Flow | ml/min Gross | ml/min Net, 75° F. | H, 75° F. sec-atm/gm |
|---|---|---|---|---|---|---|---|---|
| 1 | 35 | 20 | 86 | .872 | 40/.25 | 160 | 139.5 | .029 |
| 2 | 35 | 20 | 86 | .872 | 40/.25 | 160 | 139.5 | .029 |
| 3 | 35 | 20 | 86 | .872 | 40/.25 | 160 | 139.5 | .029 |
| 4 | 35 | 20 | 86 | .82 | 40/.25 | 160 | 139.5 | .029 |

The following Table shows a correlation of H-value to cartridge efficiency, $\beta$, for the second example:

TABLE 6

H-VALUE CORRELATION TO CARTRIDGE EFFICIENCY (EXAMPLE 2)

| A(g/s-cm²-atm) | Length (cm) | $\sqrt{2AH}$ | $\alpha = L\sqrt{2AH}$ | $\beta$ |
|---|---|---|---|---|
| 100 | 25" = 63.5 | .01025 | .651 | .876 |
| 500 | 63.5 | .02291 | 1.454 | .610 |
| 1,000 | 63.5 | .03240 | 2.057 | .424 |
| 5,000 | 63.5 | .0726 | 4.610 | .212 |
| 10,000 | 63.5 | .10246 | 6.530 | .154 |
| 20,000 | 63.5 | .1449 | 9.212 | .107 |
| 30,000 | 63.5 | .1816 | 11.586 | .088 |

EXAMPLE 3

The following Table lists the H-value calculations for Example 3, wherein a K-200 Gore-Tex membrane 0.2 microns in pore size is laminated onto a Nalle channel material having a 56 wale rating. The system pressure is maintained at 50 psi and a temperature of 81° F., with no end leakage being detected.

TABLE 7

H-VALUE DETERMINATION
(EXAMPLE 3)

| Hrs. at Press | F-B Side Press, psi | P psi | Temp °F. | TCF | Flow | ml/min Gross | ml/min Net, 75° F. | H, 75° F. sec-atm/gm |
|---|---|---|---|---|---|---|---|---|
| 1 | 50 | 11 | 81 | .893 | 37 | 37 | 34.3 | .048 |
| 2 | 50 | 11 | 81 | .893 | 37 | 37 | 34.3 | .048 |
| 3 | 50 | 11 | 81 | .893 | 37 | 37 | 34.3 | .048 |
| 4 | 50 | 11 | 81 | .893 | 37 | 37 | 34.3 | .048 |

The following Table shows a correlation of H-value to the cartridge efficiency, $\beta$ for the membrane-carrier construction of Example 3.

TABLE 8

H-VALUE CORRELATION TO CARTRIDGE EFFICIENCY
(EXAMPLE 3)

| $A(g/s\text{-}cm^2\text{-}atm)$ | Length (cm) | $\sqrt{2AH}$ | $\alpha = L\sqrt{2AH}$ | $\beta$ |
|---|---|---|---|---|
| 100 | 25" = 63.5 | .00948 | .602 | .900 |
| 500 | 63.5 | .0212 | 1.347 | .675 |
| 1,000 | 63.5 | .0312 | 1.906 | .500 |
| 5,000 | 63.5 | .0670 | 4.259 | .235 |
| 10,000 | 63.5 | .0948 | 6.024 | .165 |
| 20,000 | 63.5 | .134 | 8.519 | .115 |
| 30,000 | 63.5 | .164 | 10.43 | .095 |

EXAMPLE 4

The following Tables shows the calculations for the H-value for the arrangement of Example 4, wherein an E-500 polysulfone membrane (available from Desalination Systems, Inc., assignee of the present invention) is cast onto a K-1015 polyester felt backing, which in turn is applied to a Hornwood 7808 Tricot carrier having a 48 wale rating. The system pressure is maintained at 200 psi at a temperature of 82° F. The end leakage for the F-side, or feed side, was 10 ml per minute and 12 ml per minute leakage rate was observed on the B-side, or brine side.

TABLE 9

H-VALUE DETERMINATION
(EXAMPLE 4)

| Hrs. at Press | F-B Side Press, psi | P psi | Temp °F. | TCF | Flow | ml/min Gross | ml/min Net, 75° F. | H, 75° F. sec-atm/gm |
|---|---|---|---|---|---|---|---|---|
| 1 | 200 | 30 | 82 | .915 | 25/.5 | 38 | 34.76 | .351 |
| 2 | 200 | 30 | 82 | .915 | 25/.5 | 38 | 34.76 | .351 |
| 3 | 200 | 30 | 82 | .915 | 25/.5 | 38 | 34.76 | .351 |
| 4 | 200 | 30 | 82 | .915 | 25/.5 | 38 | 34.76 | .351 |

The following Table 10 lists the correlation of H-value to cartridge efficiency, $\beta$, for the arrangement of FIG. 4:

TABLE 10

H-VALUE CORRELATION TO CARTRIDGE EFFICIENCY
(EXAMPLE 4)

| $A(g/s\text{-}cm^2\text{-}atm)$ | Length (cm) | $\sqrt{2AH}$ | $\alpha = L\sqrt{2AH}$ | $\beta$ |
|---|---|---|---|---|
| 100 | 25" = 63.5 | .02449 | 1.548 | .585 |
| 500 | 63.5 | .0590 | 3.746 | .270 |
| 1,000 | 63.5 | .0836 | 5.312 | .188 |
| 5,000 | 63.5 | .1870 | 11.87 | .089 |
| 10,000 | 63.5 | .2649 | 16.80 | .061 |
| 20,000 | 63.5 | .3746 | 23.79 | .045 |
| 30,000 | 63.5 | .4589 | 29.14 | .033 |

As can be seen from the above data, very attractive cartridge efficiency factors can be realized for commercially important applications. A comparison of the above membrane configurations, especially when configured in spiral wound cartridges, will now be made to one example of a three layer membrane system.

COMPARISON OF TWO-LAYER AND THREE-LAYER MEMBRANE CONSTRUCTIONS

The following is a comparison of an amorphous-locked membrane designated K-200 by W. L. Gore & Associates, Inc. The membrane is analyzed using the above-described two-layer construction, where it is laminated directly onto a permeate carrier channel material, and a three-layer structure where it is applied to a polypropylene felt backing layer, and then used in conjunction with a third layer, i.e., a permeate carrier of Tricot material. As can be seen, a considerable improvement in efficiency is realized with membranes and carriers constructed according to the present invention, even for extended leaf lengths. Using the test setup as described above with reference to FIGS. 6-8, a single leaf amorphous-locked membrane of K-200 Gore-Tex material 2 microns in pore size, laminated onto a Conwed channel material, 20 wale, was constructed. Since the membrane has a water intrusion pressure of less than 30 psi, the following data, which measures of the product water side pressure drop constant, H, does not reflect pressures exceeding that limit.

TABLE 11

PRODUCT WATER SIDE PRESSURE DROP MEASUREMENTS
FOR GORE-TEX MEMBRANE ON CONWED CHANNEL MATERIAL

| Hrs. at Press | F-B Side Press, psi | P psi | Temp °F. | TCF | Flow | ml/min Gross | ml/min Net, 75° F. | H, 75° F. sec-atm/gm |
|---|---|---|---|---|---|---|---|---|
| 1 | 20 | 5.5 | 18.1 | 1.16 | 35.8 | 35.8 | 41.6 | .0513 |
| 2 | 20 | 5.25 | 19.7 | 1.11 | 33.0 | 33 | 36.7 | .0555 |
| 3 | 20 | 5.0 | 20.7 | 1.08 | 34.0 | 34 | 36.8 | .0527 |
| 5 | 20 | 4.5 | 22.0 | 1.05 | 33.0 | 33 | 34.6 | .0505 |

The following Table lists the cartridge efficiency factor, $\beta$, for leaves of five different lengths, assuming the average H-value of 0.0525, as determined from Table 11:

TABLE 12

$\beta$ vs A, L, for K-200 GORE-TEX
MEMBRANE ON CONWED CHANNEL MATERIAL

| A(g/s-cm²-atm) | L (in) | L (cm) | $\sqrt{2AH}$ (cm-l) | $\alpha = L\sqrt{2AH}$ | $\beta$ |
|---|---|---|---|---|---|
| 100 | 20 | 50.8 | .01025 | .520 | .923 |
|  | 25 | 63.5 |  | .651 | .876 |
|  | 30 | 76.2 |  | .782 | .836 |
|  | 35 | 88.9 |  | .913 | .786 |
|  | 40 | 101.6 |  | 1.043 | .767 |
| 200 | 20 | 50.8 | .01449 | .736 | .855 |
|  | 25 | 63.5 |  | .873 | .813 |
|  | 30 | 76.2 |  | 1.108 | .725 |
|  | 35 | 88.9 |  | 1.288 | .670 |
|  | 40 | 101.6 |  | 1.472 | .618 |
| 500 | 20 | 50.8 | .02291 | 1.164 | .715 |
|  | 25 | 63.5 |  | 1.454 | .610 |
|  | 30 | 76.2 |  | 1.745 | .536 |
|  | 35 | 88.9 |  | 2.037 | .474 |
|  | 40 | 101.6 |  | 2.327 | .427 |
| 1000 | 20 | 50.8 | .03240 | 1.646 | .491 |
|  | 25 | 63.5 |  | 2.057 | .424 |
|  | 30 | 76.2 |  | 2.468 | .400 |
|  | 35 | 88.9 |  | 2.880 | .346 |
|  | 40 | 101.6 |  | 3.291 | .305 |
| 3000 | 20 | 50.8 | .05612 | 2.8508 | .348 |
|  | 25 | 63.5 |  | 3.5636 | .280 |
|  | 30 | 76.2 |  | 4.2763 | .223 |
|  | 35 | 88.9 |  | 4.9890 | .200 |
|  | 40 | 101.6 |  | 5.7017 | .178 |
| 5000 | 20 | 50.8 | .0726 | 3.688 | .297 |
|  | 25 | 63.5 |  | 4.610 | .212 |
|  | 30 | 76.2 |  | 5.532 | .187 |
|  | 35 | 88.9 |  | 6.454 | .159 |
|  | 40 | 101.6 |  | 7.376 | .139 |
| 10,000 | 20 | 50.8 | .10246 | 5.204 | .192 |
|  | 25 | 63.5 |  | 6.537 | .154 |
|  | 30 | 76.2 |  | 7.806 | .128 |
|  | 35 | 88.9 |  | 9.108 | .115 |
|  | 40 | 101.6 |  | 10.409 | .096 |
| 20,000 | 20 | 50.8 | .1449 | 7.360 | .135 |
|  | 25 | 63.5 |  | 9.212 | .107 |
|  | 30 | 76.2 |  | 11.041 | .089 |
|  | 35 | 88.9 |  | 12.882 | .077 |
|  | 40 | 101.6 |  | 14.723 | .065 |
| 30,000 | 20 | 50.8 | .1816 | 9.225 | .110 |
|  | 25 | 63.5 |  | 11.586 | .088 |
|  | 30 | 76.2 |  | 13.830 | .073 |
|  | 35 | 88.9 |  | 16.144 | .062 |
|  | 40 | 101.6 |  | 18.450 | .055 |

The following data compares a K-200 Gore-Tex membrane laminated directly on the non-woven Conwed channel materials as described above, and a three-layer construction where the K-200 Gore-Tex membrane is cast onto a polypropylene felt, and is thereafter applied to a third permeate carrier layer of Tricot material. The following Table summarizes the comparison results:

TABLE 13

COMPARISON OF TWO-LAYER
AND THREE-LAYER CONSTRUCTIONS

| Element | Psi | Temp °F. | Product Flow (Ml/min-75° F.) | Conc. Flow (1/min) | Effective A × 10⁻⁵ (g/atm-cm²-s) |
|---|---|---|---|---|---|
| Three-Layer Construction: (K-200 w/Tricot material 1.5 ft²) | | | | | |
|  | 5 | 77 | 185 | 2.2 | 648 |
|  | 10 | 77 | 443 | 3.8 | 776 |
|  | 15 | 77 | 681 | 4.7 | 797 |
|  | 19 | 77 | 828 | 4.8 | 763 |
| Two-Layer Construction: (K-200 w/Conwed channel material 1.3 ft²) | | | | | |
|  | 5 | 78 | 288 | 2.2 | 1164 |
|  | 10 | 78 | 586 | 3.7 | 1181 |
|  | 15 | 78 | 874 | 4.7 | 1178 |
|  | 19 | 78 | 1038 | 4.2 | 1105 |

For the three-layer construction, that of a K-200 membrane with polypropylene felt backing layer and Tricot permeate carrier, the A-value or membrane constant was 11,800, while the two-layer construction, using the same K-200 membrane laminated directly onto Conwed channel material at a membrane constant (A-value) of 9,027.

The following gives a theoretical calculation of the A-value for each of the two constructions, which shows good agreement with the data of the above examples. For the three-layer construction, the membrane constant, A, is calculated as follows:

$$A = \frac{ml/min @ 75° F.}{(60 \text{ sec/min (ft}^2)) (932 \text{ cm}^2/\text{ft}^2) \text{ psi/atm}}$$

Rearranging $$A = 2.62 \times 10^{-5} \frac{ml/min @ 75° F.}{(ft^2)(psi)}$$

$$A = \frac{2.62 \times 10^{-5} \times 443 \text{ ml/min}}{1.5 \text{ ft}^2 \times 10}$$

$$A = 776 \times 10^{-5} \text{ g/s-cm}^2\text{-atm}$$

Using the above-listed results, the cartridge efficiency factor ($\beta$-value) for an element of leaf length 25", A-value 11,800 and Tricot of H-value 0.03 is 0.071.

$A = 11,800 \times 0.071$

Effective $A = 838 \times 10^{-5}$ g/s-cm²-atm

This represents a 7.9% difference between cell test data and cartridge calculations.

Similar calculations for the two-layer construction give:

$$A = 2162 \times 10^{-5} \frac{\text{ml/min @ 75° F.}}{\text{(psi) (ft}^2)}$$

$$A = 2.62 \times 10^{-5} \frac{586 \text{ ml/min}}{10 \text{ psi} \times 1.3 \text{ ft}^2}$$

$$A = 1181 \times 10^{-5} \text{ g/s-cm}^2\text{-atm}$$

Using the above-listed results, where the H-value is 0.0525 for an element with leaf length 25", a membrane A-value of 9027 yields a cartridge efficiency factor of 0.154.

$$A = 9027 \times 0.154$$

Effective $A = 1380$

Experimental calculations give 1181, with an acceptable 17.6% difference between calculated and experimental A-values.

As illustrated above, the combination of amorphous-locked membrane directly laminated onto a polypropylene permeate carrier yield a flux increase of two to three times, compared to a three-layer construction of the same membrane material, and also exhibit less fouling at the same feed rates and pressures.

Thus, in light of the above, the improved performance resulting from the direct lamination of the amorphous-locked membrane material onto a polypropylene permeate carrier is validated by theoretical calculations which agree quite closely with the above-listed empirically-derived data.

In addition to the above-described improvements in cartridge efficiencies, further advantages are realized with wound membrane cartridges constructed according to the present invention. Most notably, with the elimination of the third layer, additional membrane layers can be incorporated into a cartridge of given size. For example, elimination of the Tricot layer, approximately 10 to 12 mils in thickness, yields an 8.5% gain in active area.

Further advantages became apparent in the membrane-carrier construction described above, wherein the amorphous-locked Gore-Tex membrane is laminated directly onto a Conwed or Nalle polypropylene channel material. Unlike other non-woven layers (i.e., felt) attached to a membrane, the non-woven polypropylene channel material described above maintains amorphous-locked Gore-Tex membranes in a tauter condition over a wide range of operating pressures, without allowing the membrane material to stretch or bag over long periods of use. The Conwed and Nalle channel materials, in particular, were observed to provide a tighter adhesion to the membrane than was possible with conventional, non-woven polypropylene felt backing layers.

According to other aspects of the present invention, a significant improvement in cartridge performance can also be realized by directly laminating or casting membrane layers other than the amorphous-locked membranes as described above, directly onto a non-woven channel material which is ribbed to form channels in the permeate-carrying direction. For example, thin film composite membranes, and especially microporous, semipermeable ultrafiltration and reverse-osmosis membranes, such as polysulfone membranes, which are cast separately and then laminated onto a carrier layer of the type described in FIG. 5, yield significantly improved cartridge efficiencies. Such a polysulfone ultrafiltration membrane laminated to a thin felt can be used with the improved permeate carrier to reduce flow resistance and improve the separation of a gas component from a gaseous mixture.

According to one aspect of the present invention, the combination of an amorphous-locked membrane and a polypropylene channel material is particularly useful for separating oil and other non-polar liquids from polar liquids such as water, Spiral-wound cartridges incorporating membranes of high flux characteristics can be effectively employed to "polish" or further treat the discharge from a deionizing ion-exchange resin installation.

Although the invention has been illustrated and described with regard to certain particularly preferred embodiments, it should be understood that changes and modifications as would be obvious to one having the ordinary skill in the art may be made without deviating from the scope of the invention which is set forth in the appended claims. Particular features of the invention are emphasized in the claims which follow.

What is claimed is:

1. A membrane cartridge for separating a first component from a fluid mixture of the first component and a second component, comprising:
   a porous sheetlike membrane having pores sized to allow passage of the first component in a generally transverse direction while rejecting passage of the second component therethrough;
   a permeate carrier layer of non-woven channel material having a plurality of generally parallel ribs, interconnected by a web-like matrix of much smaller fibrils to form a membrane-engaging surface with permeate-carrying channels between the ribs extending in a preselected direction of exit flow;
   conduit means for conducting the exit flow of the first component permeate away from said channels; and
   said membrane-engaging surface adhering to said membrane so as to maintain said membrane taut as a working pressure is applied across the membrane to force permeation therethrough.

2. The cartridge of claim 1 wherein said ribs have a preselected dimension in the liquid permeate-passing direction and said fibril matrix has a thickness no greater than one-half said preselected dimension and is positioned to span the distance between said ribs and is located adjacent said membrane.

3. The cartridge of claim 1 wherein said channel material comprises a polypropylene layer having between 10 and 100 channels per inch.

4. The cartridge of claim 1 wherein said channel material comprises polypropylene material having between about 20 and about 60 channels per inch.

5. The cartridge of claim 1 wherein a leaf formed of said membrane and permeate carrier layer is joined to and wound spirally about said conduit means together with a sheet of porous supply material, said leaf comprising a composite layer of said membrane adhering to said permeate carrier layer and folded at an outer edge remote from said conduit means to create a sandwich of two layers of said permeate carrier in contact with each other between the two outer sheets of membrane.

6. The cartridge of claim 5 further comprising a pair of spaced strips of adhesive joinder material extending from said conduit means to the folded free end of said composite layer so as to create an envelope which prevents flow of the fluid mixture into said channels other than through said membrane.

7. A filtration module for separating a fluid permeate from a mixture of the fluid and a second component, comprising:
- a self-supporting membrane made from an amorphous-locked poly(tetrafluoroethylene) polymer having a micro-structure characterized by nodes interconnected by fibrils in intimate contact with said membrane, said membrane having pores sized to allow passage of the permeating fluid in a generally transverse direction while rejecting passage of the second fluid component therethrough;
- a permeate carrier layer of non-woven ribbed channel material, having a membrane-contacting surface with a plurality of generally parallel ribs interconnected by a web-like matrix of much smaller fibrils, said ribs permeate-carrying channels formed between said ribs extending in a preselected direction, said channel material surface adhering to said membrane so as to maintain said membrane taut as a working pressure is applied across the membrane to draw said permeate therethrough; and
- conduit means for conducting the fluid permeate away from said channels, including a product collection tube about which said membrane and said layer are spirally wound such that said permeate carrier layer of channel material provides the sole path for the permeate to said product collection tube.

8. The module of claim 7 wherein a leaf of said membrane and permeate carrier layer is joined to said conduit means, said leaf comprising a composite layer of said membrane joined to said permeate carrier layer folded at an outer edge remote from said conduit means such that layers of said permeate carrier layer directly oppose each other.

9. The module of claim 8 further comprising a pair of spaced strips of adhesive joinder material extending from said conduit means to the folded free end of said composite layer so as to create an envelope which prevents the flow of the fluid mixture into said channels other than through said membrane.

* * * * *